3,508,048
RADIOMETRIC ANALYSIS BY FLOWING SAMPLE
THROUGH A CLOSED SYSTEM
Peter Edward Starnes, Berkshire, England, assignor to
Hilger & Watts Limited, London, England, a British
company
Filed Apr. 5, 1967, Ser. No. 628,644
Claims priority, application Great Britain, Apr. 7, 1966,
15,777/66
Int. Cl. G01m 23/12; G01t 1/16; H01j 39/00
U.S. Cl. 250—43.5    11 Claims

ABSTRACT OF THE DISCLOSURE

Method of, and apparatus for, analyzing by radioactive activation samples in which the sample material is circulated in fluid form or in the form of a suspension, through a closed loop at a substantially constant mass flow rate. While circulating, the sample is activated by a neutron source and the resulting secondary radiation detected, the circulation being continued until equilibrium between activation and decay is established. Thereafter the desired information is derived from the magnitude of the secondary radiation by reference to the corresponding magnitude of secondary radiation observed with standard materials.

---

This invention relates to a form of radiometric analysis known as activation analysis. In this form of analysis, atoms of an element or elements present in a material are first rendered radio-active by irradiation by high energy particles or photons and the radio-activity so induced is subsequently measured and used to indicate the proportion of the element or elements present in the material.

The method generally employed consists of first taking a small weighed sample of the material and irradiating the sample from a suitable source of radiation, a commonly a neutron generator, for a pre-determined time. Subsequently the sample is removed in toto from the neutron field and placed in proximity to a radiation detector where radiation, usually in the form of gamma rays, arising from the decay of atoms which were activated in the neutron field is measured, the measurement being compared with a similar measurement made on known materials to provide an index of the composition of the original sample material.

As an accurate quantitative method, this technique suffers from several serious limitations, particularly in regard to its application in industry for the analysis of bulk materials such as minerals and ores. These limitations may be summarized as follows:

(1) The geometry of the activation and measuring systems usually restricts the sample size to less than 100 grams or so. Because of this, the difficulty of preparing a truly representative sample from a large volume of coarse, heterogeneous, material is often formidable, if not impossible of solution in practical terms.

(2) Ideally, every part of the sample volume of each sample analyzed should be subjected to an equivalent neutron flux during the activation process, and the measurement geometry should not be biased in favor of any part of the sample volume. Clearly, this is not possible with a static sample, and complex rotating mechanisms together with internal standards are often used to minimize errors due to spatial and temporal variations in flux.

(3) Where the gamma radiation which it is desired to measure is associated with a decay characterized by a short half-life, the maximum effective time available for the collection of counts may be too short to permit the required statistical accuracy to be achieved in a single measurement. In this case, multiple measurements have to be made on the same sample with a consequent significant increase in the time necessary to complete the analysis.

(4) Where short half-life decay events are involved, a high degree of accuracy has to be maintained in the timing of the various stages of the analytical procedure, i.e. activation, transfer and counting.

It is a main object of the invention to provide a method of, and apparatus for, carrying out activation analysis as hereinbefore described in a manner substantially free from errors due to variations in the geometric and time factors.

It is another object of the invention to permit activation analysis to be conducted using an irradiation source or sources of reduced power or activity without loss of accuracy.

It is a further object of the invention to minimize errors due to fluctuations in the power of the irradiation source or sources.

According to one aspect of the invention, there is provided a method of carrying out activation analysis on samples of materials which are either in fluid form or consist of solid particles suspended in a fluid, including the steps of circulating the sample material at a substantially constant mass flow rate through a closed loop system, activating the sample material while it is circulating through the system by means of a neutron source, detecting and measuring the secondary radiation resulting from the decay of atoms of the activated sample material, the circulation process being continued until equilibrium between activation and decay is substantially established and at least one level of secondary radiation to be measured has achieved a substantially constant value, determining the true or equilibrium constant value from one or more measurements and deriving the desired analytical information from the magnitude of the said equilibrium constant value or values by reference to the corresponding magnitude or magnitudes observed with standard materials under similar conditions.

In the case of measurements relating to atomic decay processes having relatively long half-lives, it is not necessary to wait for equilibrium between activation and decay to be fully established and for the level of measured radiation to reach absolute constancy. Instead, the equilibrium level may be accurately deduced from one or more measurements made at known intervals of time after the commencement of the activation process as equilibrium is approached.

The foregoing method affords the following advantages over the earlier known methods of activation analysis which are of particular importance in relation to the analysis of minerals, ores and other industrial materials:

(1) The quantity of material used for a determination is some 50 to 100 times larger, typically 5 to 10 kg. in weight of dry solids. This greatly simplifies the problem of producing representative examples from bulk, heterogeneous, materials.

(2) Since the randomly dispersed solids are recirculated many times through the system during the measurement period, there is complete freedom from errors due to spatial variations in neutron flux and/or presentation bias. Furthermore the effects of any short term temporal variations in neutron flux are also minimized.

(3) When measuring the radiations from short half-life isotopes, equilibruim is rapidly attained and the steady count rate then obtained allows uninterrupted measurement for as long as is necessary to provide the desired statistical accuracy with the minimal error due to inaccuracies in timing.

According to a further aspect of the invention, there is provided apparatus for carrying out activation analysis on samples of materials which are either in fluid form or consist of solid particles suspended in a fluid, including a closed loop system which incorporates an activation conduit and a measurement conduit, means for inducing circulation of the material through the system at a substantially constant mass flow rate, a neutron source associated with the activation conduit for activating the sample material while it is circulating through the system and a radiation detector associated with the measurement conduit for detecting and measuring secondary radiation resulting from the decay of atoms of the sample material activated during passage through the activation conduit.

Figure 1:
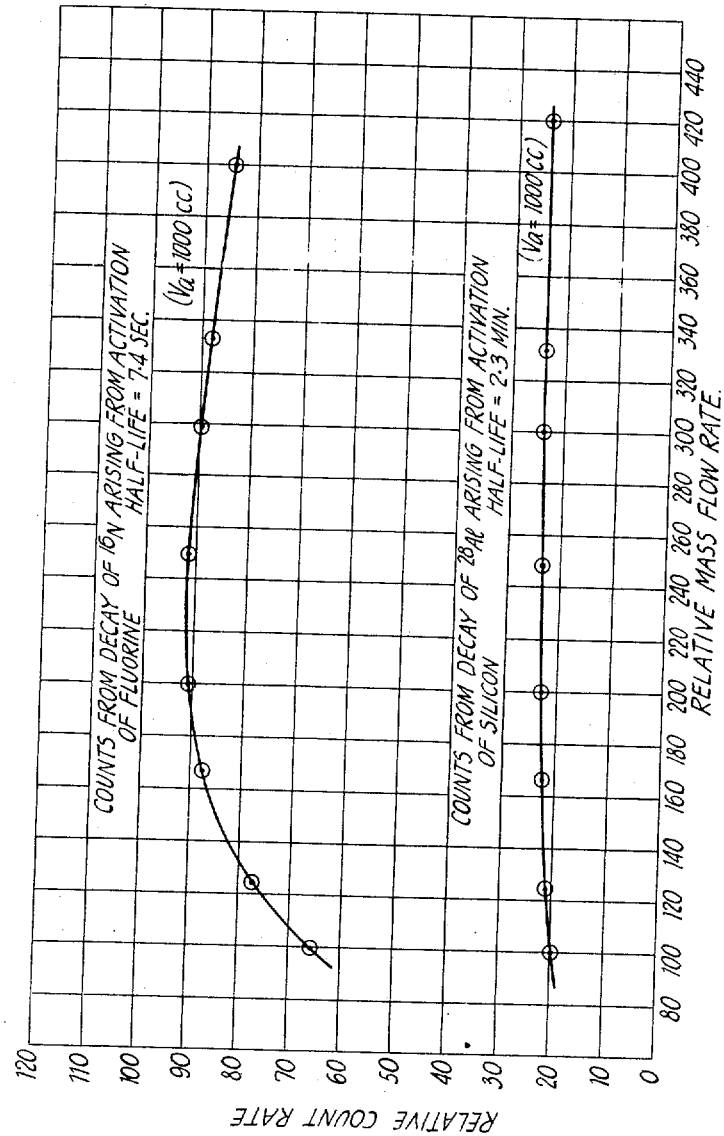
FIG. 1 is a graphical representation of the count rates of different substances following irradiation.

The dimensions and configurations of the activation and measurement conduits and the flow means connecting them and the relative positions of the activating conduit and the neutron source together with the flow rate of the sample through the system are chosen so as to be appropriate to the measurement or measurements which it is desired to undertake. In this context it is necessary to consider two primray parameters which largely influence the design of the apparatus for any given application.

These are:

(1) The threshold energy or energies for the activation process or processes involved, and (2) The decay rates of activated atoms giving rise to the radiation or radiations to be measured.

By designing the apparatus with due consideration for these parameters, it is possible to overcome interference effects resulting from the emission of gamma-rays of identical or similar energies by isotopes or excited states originating from different parent elements, these effects being common causes of loss of accuracy in the case of known activation analysis methods.

For example, if a sample of material contains compounds of both silicon and aluminum, difficulty arises from the fact that both silicon and aluminum yield, on neutron activation, a daughter isotope $^{28}$Al which decays with a half-life of 2.3 minutes yielding a gamma-ray having an energy of 1.78 mev. In the case of silicon, however, the activation threshold is 3.9 mev. while aluminum interacts with so-called thermal neutrons, that is neutrons having energies well below the silicon threshold. Therefore by designing the apparatus so that the neutrons are effectively thermalized before interaction with the sample material, the activation of silicon can be substantially inhibited so that it is possible to determine aluminum in a sample containing both silicon and aluminum. The desired thermalizing effect can be achieved either by the provision of a moderating material between the neutron source and the sample in the activating conduit or by use of an appropriate proportion of water or other moderating liquid as the suspending fluid. It will also be appreciated that by using a source of neutrons having a known energy distribution from say 10 mev. down to thermal energies, both silicon and aluminum can be simultaneously activated and their decay products measured so that by carrying out two measurements, one with neutrons which have been substantially thermalized, and the other with neutrons of known energy distribution, it is possible to determine both aluminum and silicon in a material containing these elements.

Similarly, the difference in the decay rates of the activated atoms concerned may be used to eliminate interference between, for example, radiation emitted by $^{16}$N arising from the activation of fluorine during the estimation of the latter element and other elements such as silicon which may also be present in the sample. Here use is made of the fact that the half-life of $^{16}$N is 7.4 seconds, while the half-life of $^{28}$Al arising from the silicon is in excess of two minutes. In this case, therefore, the apparatus is designed so that two alternative flow paths may be followed corresponding to transit times between activation and measurement of some 3 seconds and some 40 seconds respectively. Measurements made with the flow following the first path will include contributions from both the elements mentioned, but the higher energy gamma-ray (6.1 and 7.1 mev.) characteristic of the $^{16}$N decay can be separated from the lower energy gamma-rays derived from $^{28}$Al by known electronic discrimination means and counted without interference. In the case of measurements made using the second flow path, the radiation resulting from the decay of $^{16}$N will have dropped to a very low level which level may be calculated from the first measurement of $^{16}$N decay gamma radiation. Thus the count obtained during the second measurement can be corrected to provide a true index of the intensity of the low energy $^{28}$Al gamma-rays.

Calibration with known samples will therefore permit the accurate determination of both the fluorine and silicon contents of the original sample material.

With regard to the optimum flow rate for the sample material, the following factors are important and must be taken into account in the design of the apparatus.

(1) The flow rate must be adequate to maintain fully in suspension any solids present in the sample material but should not be excessive so as to avoid undue wear and tear and overheating of the apparatus by friction.

(2) The flow rate should be chosen so that small variations in the flow rate which may occur in practice do not significantly affect the accuracy of the determination. The approximate relationship between equilibrium, count rate, decay-rate, sample flow rate and the times spent in traversing the various sections of the flow system may be expressed as follows:

$$\text{Equilibrium Count Rate} = \frac{\frac{K}{\lambda} \cdot f e^{-\lambda t_1}(1-e^{-\lambda t_2})(1-e^{-\lambda t_3})}{(1-e^{-\lambda T})}$$

where

K is a constant characteristic of the interaction parameters and the geometry of the system,
$f$ is flow rate of the element (gms. per second),
$e$ is the exponential constant,
$\lambda$ is the decay constant of the radioisotope being considered,
$t_1$ is the transit time from the end of the irradiation conduit to the beginning of the measurement conduit,
$t_2$ is the effective time spent in the activating field,
$t_3$ is the effective time spent in the measuring conduit,
T is the total time spent during one complete circuit of the system.

The value of $t_2$, the effective activation time, corresponds to the time which the sample material spends in that part of the neutron field in which a significant proportion of the neutrons have energies above the relevant activation threshold. It therefore differs for interactions having different activation thresholds.

It follows from the nature of this relationship that by suitable choice of the relative volumes of the several parts of the apparatus, namely the activation and measuring conduits and the connecting flow means, it is possible to arrive at a design of apparatus whereby changes in sample flow rate causes relatively small changes in measurement count rate for decay processes having half-lives within defined limits. This is illustrated by FIGURE 1 which shows the changes in relative count rates for decay processes of different half-lives caused by changes in sample flow rate for apparatus having the following approximate dimensions:

| | |
|---|---|
| Activation conduit volume, litres | 3 |
| Counting conduit volume, litres | 3 |
| Transit pipe volume, ml. | 600 |
| Total volume of system, litres | 12 |

In each case the approximate value of $V_a$, the effective activation volume is indicated.

In order that the invention may be clearly understood and readily carried into effect, one form of apparatus for carrying out activation analysis, in accordance with the invention, will now be described, by way of example, with reference to the accompanying FIGURE 2 which shows a flow diagram of the apparatus.

Figure 2:
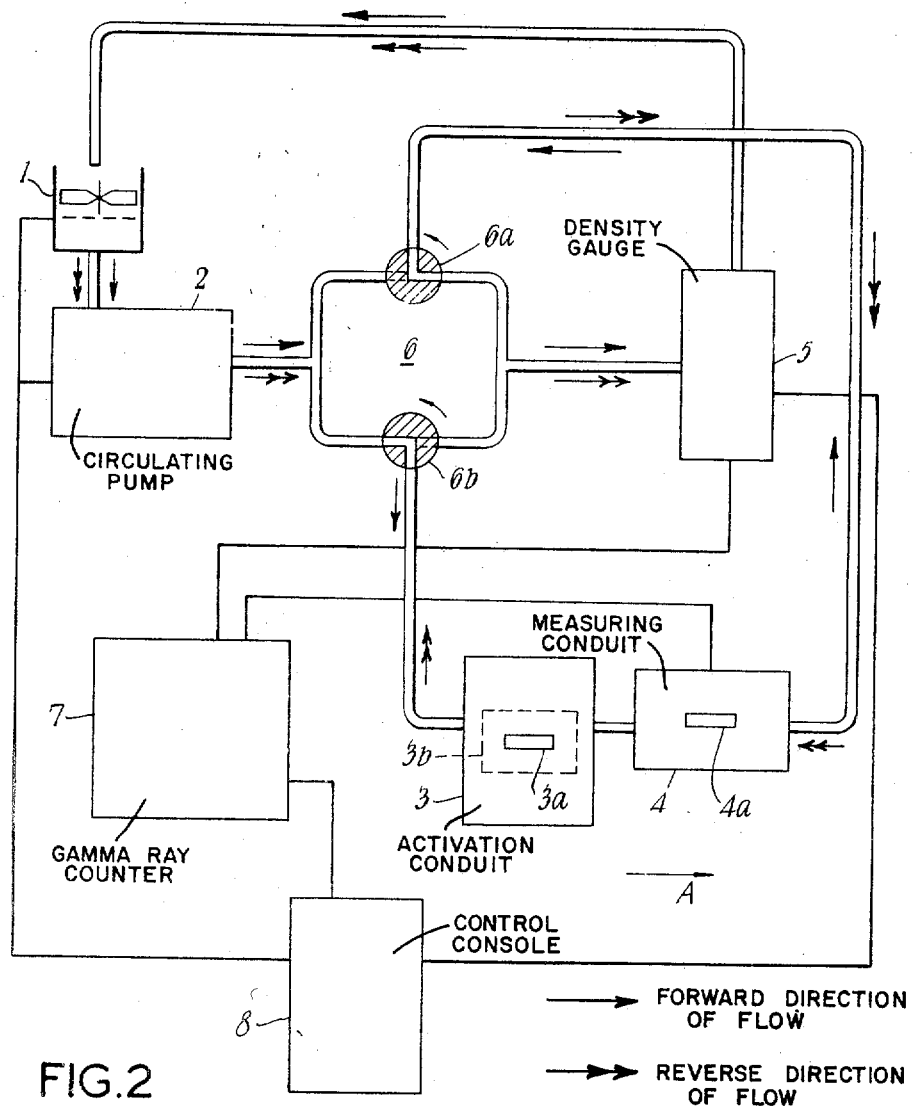
FIG. 2 is a diagrammatic illustration of one embodiment of apparatus according to the invention.

Referring to FIGURE 2, the apparatus consists of a closed loop system through which the sample of material is continuously circulated. The system incorporates a mixing and a de-aerating tank 1, a circulating pump 2 and an activation conduit 3 having a volume of some 3 litres surrounding a 3 curie Am/Be neutron source 3a, the whole assembly being suitably shielded and housed in a fire-proof steel container or "bomb." 3b denotes a moderator which may be interposed between the source 3a and the sample material if it is desired to thermalize the neutrons before interaction with the sample material as referred to above. The system also incorporates a measuring conduit 4 having a volume of some 3 litres surrounding a 3" x 3" NaI/Tl scintillation detector 4a, the whole assembly being shielded against background radiation. Part of the shielding is mounted on a counter-balanced swing arm and can be removed to provide a background count from the "bomb" for electronics standardizing purposes. The NaI/Tl crystal is water cooled to minimize thermal drift arising from heat transfer from the measuring conduit. The system further incorporates a narrow beam gamma-ray transmission density gauge 5 (substantially as disclosed in patent application No. 445,462, a connecting conduit 6 with reversing valves 6a and 6b, a known electronic counter in the form of a gamma-ray counting system 7 and a control console 8. It will be seen that the connecting pipes between the activation and measuring conduits and the connecting conduit 6 together with the valves 6a and 6b, provide two alternative flow paths for the sample of material giving rise to a choice of transit time between the material leaving the activation conduit and reaching the measuring conduit.

The apparatus is intended to be used for the analysis of samples of powdered solids suspended in water or other non-corrosive liquid. The method of operation for this purpose is illustrated by the following account of the procedure adopted for the determination of fluorine and silicon in mineral materials.

A sample of the mineral material dispersed in water of some 12 litres volume and having a solids content in the range 20 to 40% by weight is introduced into the system via the tank 1. Alternatively, the system may be partly filled with water and dry or semi-dry solids added to produce a dispersion in situ.

The sample is caused to circulate through the apparatus in the direction indicated in FIGURE 2 by the arrow A for some 90 seconds to permit equilibrium to be established. Using the counter 7, the intensity of the gamma radiation emitted by the sample during its passage through the measuring conduit 4 is determined, the measuring period being chosen so as to provide sufficient counts to insure the required statistical accuracy. By means of the reversing valves 6a and 6b the flow through part of the system is reversed. After allowing a period of 60 seconds for equilibrium to be established, a second measurement is made of the intensity of gamma radiation emitted by the sample.

Figure 3:
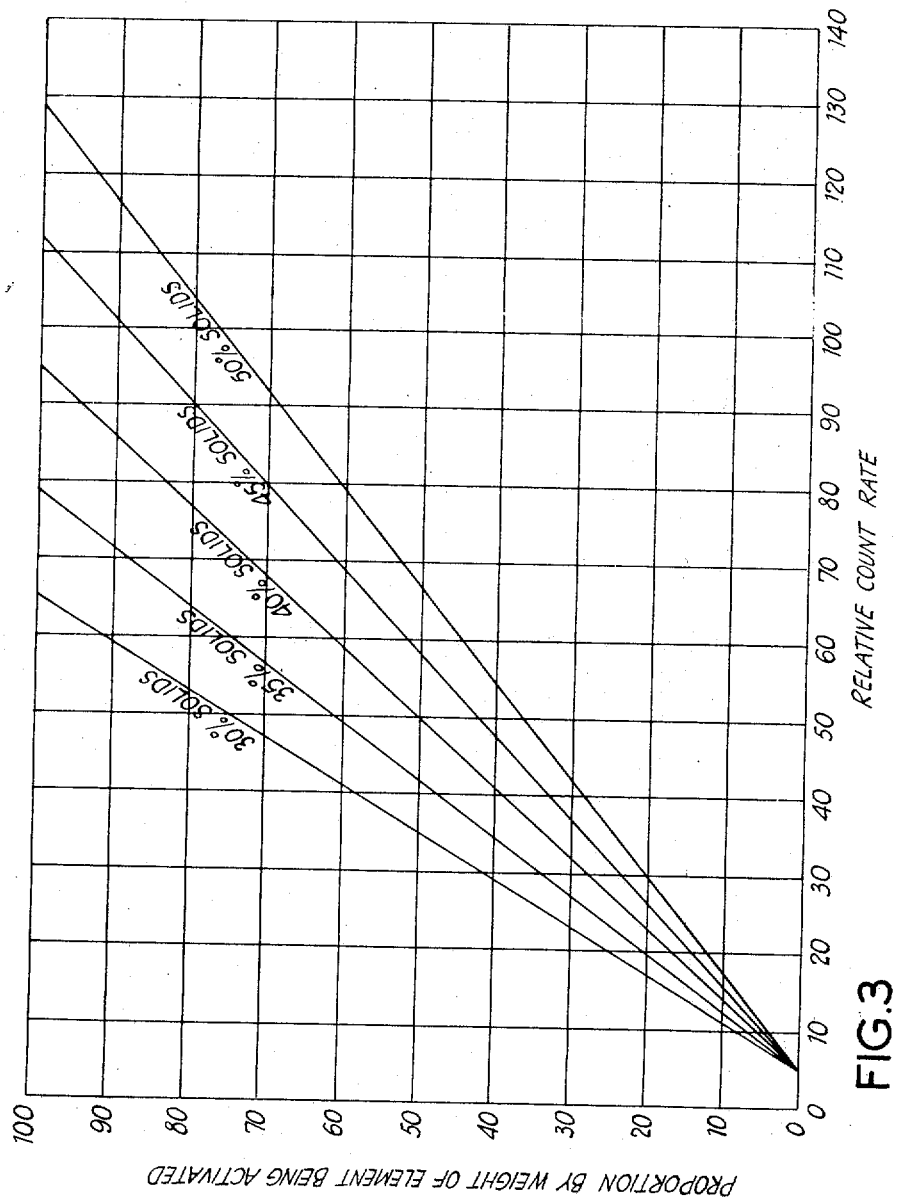
FIG. 3 is a graphical representation showing how proportions of substances can be evaluated in the mixture.

The radiation measured during the first intensity measurement referred to above will be composed primarily of higher energy (6.1 and 7.1 mev.) radiation arising from the decay of $^{16}N$ atoms produced by the activation of the fluorine atoms but may also include some lower energy (1.78 mev.) radiation resulting from the decay of the longer lived isotope $^{28}Al$ arising from the activation of silicon present in the sample material. The latter, lower energy radiation is discriminated against electronically and the $^{16}N$ decay gamma-rays are counted. In the case of the second measurement, however, the delay time between activation and measurement (of the order of 40 seconds) will insure that the count rate due to the decay of $^{16}N$ atoms had decayed to a very small value before the measurement is made. Said small value is readily calculable from the first intensity measurement referred to above and may be deducted from the second intensity measurement to yield a value for the count rate due to the decay of $^{28}Al$. Using the results of calibration experiments made with samples of known materials, the proportions of fluorine and silicon present in the original sample material are deduced using sets of calibration curves one form of which is exemplified in FIGURE 3.

As previously described herein, the NaI/Tl crystal of the radiation detector assembly is water cooled. This eliminates errors due to changes in temperature of the crystal which would otherwise be significant. To overcome possible errors due to long term thermal drift of the electronic systems, a conventional standardizing procedure is employed whereby the settings of the counting system controls are adjusted periodically to give a standard count rate, the unshielded background radiation from the "bomb" being used as a reference source. Alternatively a second small reference source which may be mechanically moved between fixed positions adjacent to or remote from the detector may be used for this purpose.

What is claimed is:

1. A method of carrying out activation analysis on a sample of at least one material in fluid form or consisting of solid particles suspended in a fluid, said method comprising the steps of circulating the sample at a substantially constant mass flow rate through a closed loop system, activating the sample while the sample is circulating through the system by means of a neutron source, detecting and measuring secondary radiation resulting from decay of atoms of the thusly activated material, continuing the circulation process until equilibrium between activation and decay is at least substantially established and the secondary radiation to be measured has achieved an at least substantially constant value, determining the equilibrium constant value from at least one measurement and comparing said equilibrium constant value with a corresponding magnitude observed with a standard material under similar conditions.

2. A method as claimed in claim 1, wherein the circulation process is continued until equilibrium is fully established and the count rate of the secondary radiation is constant within the counting statistics and the equilibrium count rate is determined by at least one measurement.

3. A method as claimed in claim 1, wherein the sample contains atoms having different activation threshold energies and the method is repeated at least once with the same sample material which is activated by neutrons having different mean energies in the rsepective activations, to overcome interference arising from the presence of atoms of different activation energies.

4. A method as claimed in claim 3, wherein the difference in neutron energy is caused by the use of moderating materials during at least one of the activations.

5. A method as claimed in claim 1, wherein the sample after activation contains atoms having different half-lives and the secondary radiation measurement comprises measurements at differing intervals of time after activation of the material.

6. A method as claimed in claim 1 comprising reversing the circulation through at least part of said system.

7. Apparatus for carrying out activation analysis on a sample of at least one material in fluid form or consisting of solid particles suspended in a fluid, said apparatus comprising a closed loop system which includes an activation conduit and a measurement conduit, means for inducing circulation of the sample through the system at a substantially constant mass flow rate, a neutron source associated with the activation conduit for activating the material while the sample is circulating through the system, and a radiation detector associated with the measurement conduit for detecting and measuring secondary radiation resulting from the decay of atoms of the sample material activated during passage through the activation conduit.

8. Apparatus as claimed in claim 7 for use with a sample containing atoms having different activation threshold energies, said apparatus further comprising a moderator interposed between the neutron source and the sample material.

9. Apparatus as claimed in claim 7 for use with a sample containing after activation atoms having different half-lives, wherein the system incorporates at least two flow paths between the activation and measurement conduits of differing lengths and valve means for determining which of the flow paths is to be employed, whereby measurements on the sample material can be made at differing intervals of time after activation of the material.

10. Apparatus as claimed in claim 7, wherein the neutron source is in the form of a long lived radio isotope together with a neutron emitting target.

11. Apparauts as claimed in claim 7, wherein the detector consists of a water cooled NaI/Tl scintillation detector shielded against background radiation.

References Cited

UNITED STATES PATENTS

| 2,744,199 | 5/1956 | Juterbock et al. |
| 3,230,370 | 1/1966 | Deans et al. _____ 250—83.3 |
| 3,239,663 | 3/1966 | Oshry et al. |

RALPH G. NILSON, Primary Examiner

M. J. FROME, Assistant Examiner

U.S. Cl. X.R.

250—83.1, 83.3